United States Patent
Takahashi (10) Patent No.: US 8,843,922 B2
(45) Date of Patent: Sep. 23, 2014

(54) CLONING VIRTUAL MACHINES BASED ON IDENTICAL HARDWARE CONFIGURATION

(75) Inventor: Tomohiro Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 769 days.

(21) Appl. No.: 12/457,440

(22) Filed: Jun. 10, 2009

(65) Prior Publication Data

US 2010/0023939 A1    Jan. 28, 2010

(30) Foreign Application Priority Data

Jul. 28, 2008   (JP) .................................. 2008-193956

(51) Int. Cl.
  G06F 9/455   (2006.01)
  G06F 9/46    (2006.01)
  G06F 15/16   (2006.01)
  G06F 15/177  (2006.01)

(52) U.S. Cl.
  CPC .................................. *G06F 9/45537* (2013.01)
  USPC ................... 718/1; 718/100; 709/223; 713/1; 713/2

(58) Field of Classification Search
  None
  See application file for complete search history.

(56) References Cited

U.S. PATENT DOCUMENTS

| | | | | |
|---|---|---|---|---|
| 6,802,062 | B1 * | 10/2004 | Oyamada et al. | 718/1 |
| 7,302,608 | B1 * | 11/2007 | Acharya et al. | 714/13 |
| 7,356,679 | B1 * | 4/2008 | Le et al. | 713/1 |
| 7,577,722 | B1 * | 8/2009 | Khandekar et al. | 709/220 |
| 8,108,855 | B2 * | 1/2012 | Dias et al. | 717/177 |
| 8,387,045 | B2 * | 2/2013 | Yasutaka et al. | 718/1 |
| 8,484,355 | B1 * | 7/2013 | Lochhead et al. | 709/226 |
| 8,510,590 | B2 * | 8/2013 | Ji et al. | 714/3 |
| 2003/0020938 | A1 * | 1/2003 | Terada et al. | 358/1.13 |
| 2007/0162690 | A1 * | 7/2007 | Xing et al. | 711/111 |
| 2007/0226449 | A1 * | 9/2007 | Akimoto | 711/170 |
| 2008/0163194 | A1 * | 7/2008 | Dias et al. | 717/174 |
| 2008/0163210 | A1 * | 7/2008 | Bowman et al. | 718/1 |
| 2008/0244577 | A1 * | 10/2008 | Le et al. | 718/1 |
| 2008/0271016 | A1 * | 10/2008 | Chess et al. | 718/1 |
| 2009/0077552 | A1 * | 3/2009 | Sekiguchi et al. | 718/1 |
| 2009/0132683 | A1 * | 5/2009 | Furuyama et al. | 709/220 |
| 2009/0157544 | A1 * | 6/2009 | Piccionelli et al. | 705/39 |
| 2009/0228576 | A1 * | 9/2009 | Rosenan et al. | 709/221 |
| 2009/0313447 | A1 * | 12/2009 | Nguyen et al. | 711/162 |
| 2010/0211944 | A1 * | 8/2010 | Kaneda | 717/174 |

FOREIGN PATENT DOCUMENTS

JP    2002-007149    1/2002

* cited by examiner

*Primary Examiner* — Emerson Puente
*Assistant Examiner* — Benjamin Wu
(74) *Attorney, Agent, or Firm* — Fujitsu Patent Center (57) ABSTRACT

A virtual-machine generating apparatus includes a configuration-information storage unit that stores hardware resources and hardware configuration information in association with unique information of virtual machines. When accepting resources as many as the number of virtual machines to be newly introduced, the apparatus determines whether the resources identical to the accepted resources are stored in the configuration-information storage unit. When it is determined that the identical hardware resources are stored, the apparatus performs a process of copying an OS of the virtual machines having the identical resources, as many times as the number of those having the resources determined as being stored in the configuration-information storage unit.

7 Claims, 8 Drawing Sheets

| MACHINE NAME | NUMBER OF CPUs | MEMORY AMOUNT [MB] | DISK CAPACITY [MB] | INSTALL FLAG | COPY-SOURCE VIRTUAL-MACHINE NAME | ... |
|---|---|---|---|---|---|---|
| VM1 | 2 | 2048 | 40960 | TRUE | NULL | ... |
| VM2 | 2 | 1024 | 20480 | TRUE | NULL | ... |
| ⋮ | ⋮ | ⋮ | ⋮ | ⋮ | ⋮ | ... |

FIG.4A

| MACHINE NAME | NUMBER OF CPUs | MEMORY AMOUNT [MB] | DISK CAPACITY [MB] | INSTALL FLAG | COPY-SOURCE VIRTUAL-MACHINE NAME | ... |
|---|---|---|---|---|---|---|
| VM1 | 2 | 2048 | 40960 | TRUE | NULL | ... |
| VM2 | 2 | 1024 | 20480 | TRUE | NULL | ... |
| VM3 | 2 | 1024 | 20480 | FALSE | VM2 | ... |
| VM4 | 2 | 1024 | 20480 | FALSE | VM2 | ... |
| ⋮ | ⋮ | ⋮ | ⋮ | ⋮ | ⋮ | ... |

FIG.4B

| MACHINE NAME | NUMBER OF CPUs | MEMORY AMOUNT [MB] | DISK CAPACITY [MB] | INSTALL FLAG | COPY-SOURCE VIRTUAL-MACHINE NAME | ... |
|---|---|---|---|---|---|---|
| VM1 | 2 | 2048 | 40960 | FALSE | NULL | ... |
| VM2 | 2 | 1024 | 20480 | FALSE | NULL | ... |
| VM3 | 2 | 1024 | 20480 | FALSE | NULL | ... |
| VM4 | 2 | 1024 | 20480 | FALSE | NULL | ... |
| ⋮ | ⋮ | ⋮ | ⋮ | ⋮ | ⋮ | ... |

CLONING VIRTUAL MACHINES BASED ON IDENTICAL HARDWARE CONFIGURATION

CROSS-REFERENCE TO RELATED APPLICATION(S)

This application is based upon and claims the benefit of priority of the prior Japanese Patent Application No. 2008-193956, filed on Jul. 28, 2008, the entire contents of which are incorporated herein by reference.

FIELD

The embodiment(s) discussed herein is (are) directed to a virtual-machine generating apparatus, a virtual-machine generating method, and a virtual-machine generation program.

BACKGROUND

There has been a virtualization technology of logically dividing a physical computer, such as a server apparatus or PC (personal computer), into a plurality of logical computers (hereinafter, referred to as "virtual machines") and causing an OS (operating system) to be operated by each generated virtual machine. With the virtualization technology, a plurality of OSes can be operated in one hardware computing machine.

Various technologies have been disclosed to reallocate resources of a computer as a host to thus generated virtual machines. An example of such technologies is disclosed.

Figure 7A:
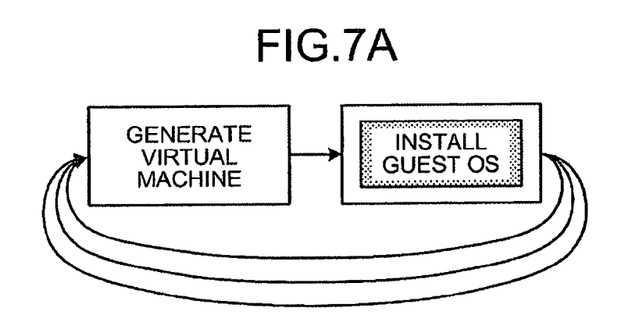
FIG. 7A is a drawing for explaining a technique of installing an OS of virtual machines one by one.

Meanwhile, in the installation of an OS for generating virtual machines explained above, as depicted in FIG. 7A, for example, after virtual machines are generated, an operation of installing a guest OS (OS installed on each virtual machine) is repeatedly and manually performed as many times as the number of machines that require installation. FIG. 7A is a drawing for explaining a technique of installing an OS of virtual machines one by one.

Figure 7B:
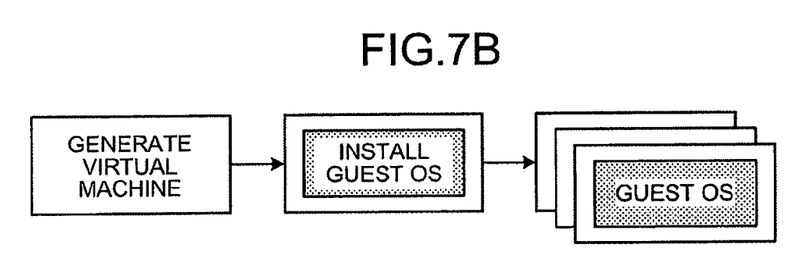
FIG. 7B is a drawing for explaining a technique of installing an OS of virtual machines through copying.

Also, for example, as depicted in FIG. 7B, an operation of installing a guest OS after virtual machines are generated and copying the installed guest OS for virtual machines with the identical configuration information of the guest OS is manually performed as many times as the number of machines that require installation. FIG. 7B is a drawing for explaining a technique of installing an OS of virtual machines through copying.

Figure 7C:
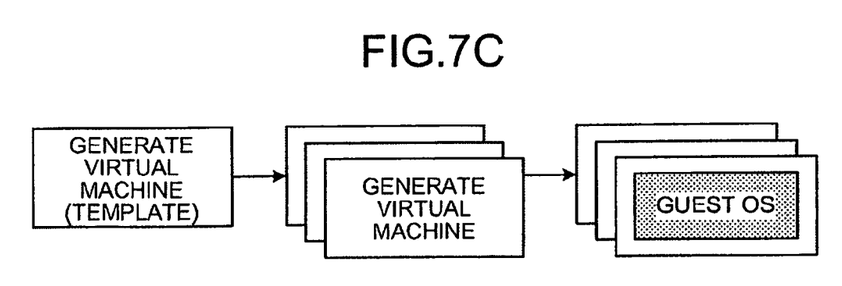
FIG. 7C is a drawing for explaining a technique of installing an OS for each virtual machine from a template of the virtual machine.

Furthermore, for example, as depicted in FIG. 7C, a virtual machine serving as a template is generated and, based on the generated virtual machine, an operation of generating virtual machines as many as required and installing a guest OS for each generated virtual machine is manually performed. FIG. 7C is a drawing for explaining a technique of installing an OS for each virtual machine from a template of the virtual machine.

However, the techniques of installing an OS of virtual machines as explained above have problems such that it takes time to generate virtual machines and the reliability of the generated virtual machines is low.

Specifically, in the techniques explained with reference to FIGS. 7A to 7C, the same operation is manually performed as many times as the number of machines to be introduced, and a setting file required at the time of installing a guest OS is manually changed and copied, and a determination as to whether the machines have different specifications is manually made. As such, in any of the technologies of installing an OS of virtual machines, it takes time to generate virtual machines, and the reliability of the generated virtual machines is low. [Patent Document 1] Japanese Laid-open Patent Publication No. 2002-7149

SUMMARY

According to an aspect of an embodiment, a virtual-machine generating apparatus includes a configuration-information storage unit that stores resources indicative of hardware resource information of a virtual machine and hardware configuration information indicative of information configuring the virtual machine in association with unique information of the virtual machine; a configuration-information checking unit that, when a new virtual machine is introduced, accepts unique information and hardware resources of the new virtual machine and determines whether the hardware resources identical to the accepted resources are stored in the configuration-information storage unit; and a basic-software introducing unit that, when it is determined by the configuration-information checking unit that the hardware resources identical to the accepted resources are stored in the configuration-information storage unit, duplicates basic software of the virtual machine having the identical hardware resources and introduces the basic software of the new virtual machine.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

With reference to the attached drawings, embodiments of the virtual-machine generating apparatus, virtual-machine generating method, and virtual-machine generation program are explained in detail below.

Figure 1:
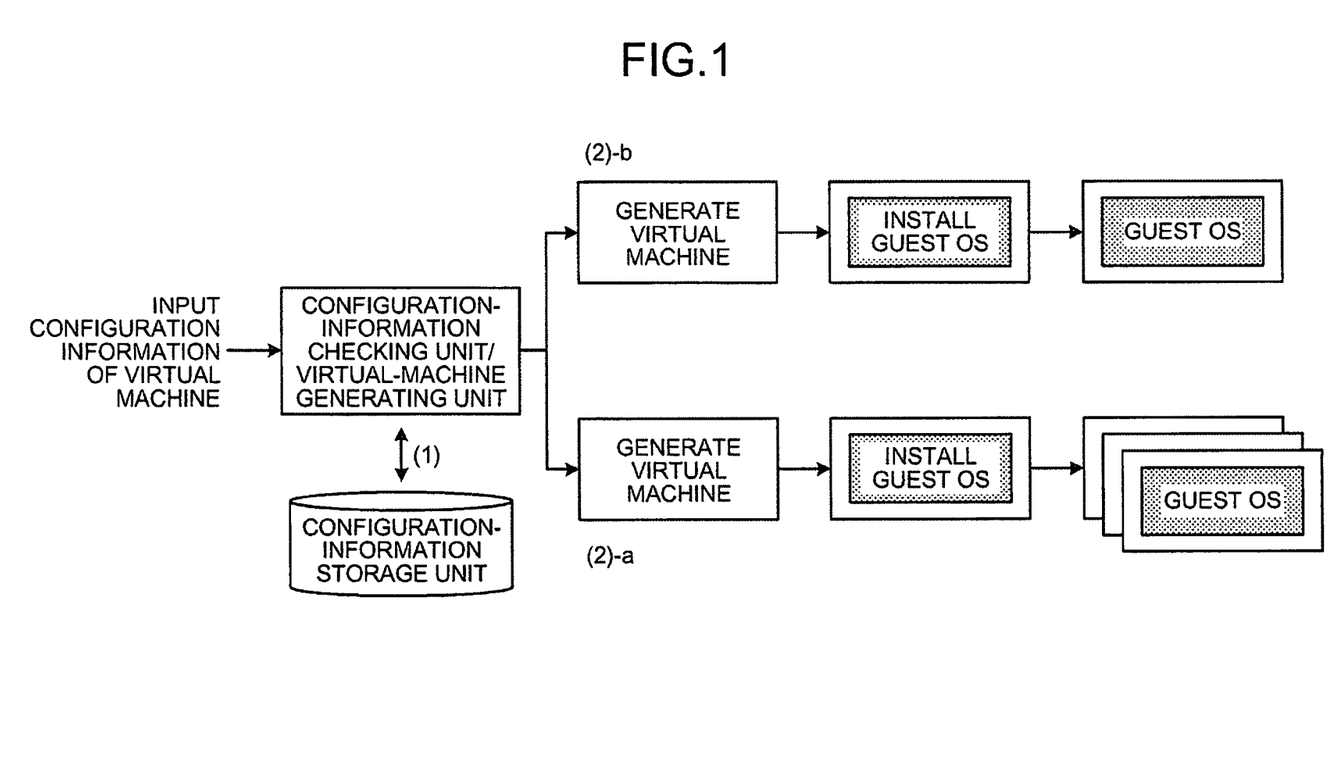
FIG. 1 is a drawing for explaining a general outline of a virtual-machine generating apparatus according to a first embodiment.

First, a general outline of a virtual-machine generating apparatus according to a first embodiment is explained by using FIG. 1. FIG. 1 is a drawing for explaining the general outline of the virtual-machine generating apparatus according to the first embodiment.

The virtual-machine generating apparatus disclosed in the present application is placed in, for example, an OS (management OS) included in an information processing apparatus, such as a server apparatus or PC, and newly generates a virtual machine based on hardware resources, such as the number of CPUs, a memory amount, and a disk capacity.

In the configuration explained above, the virtual-machine generating apparatus stores resources indicative of hardware resource information of a virtual machine and hardware configuration information indicative of information configuring the virtual machine. When a new virtual machine is introduced, the virtual-machine generating apparatus accepts unique information and hardware resources of the new virtual machine to determine whether hardware resources identical to the accepted hardware resources are stored in a configuration-information storage unit. When it is determined that such identical hardware resources are stored in the configuration-information storage unit, the virtual-machine generating apparatus duplicates basic software (or an OS) of a virtual machine having the identical hardware resources to introduce basic software for the new virtual machine.

Specifically, the virtual-machine generating apparatus has stored in the configuration-information storage unit, in association with "virtual-machine name", which is unique information of the virtual machine, hardware resources including "the number of CPUs (central processing units)", "memory amount", and "disk capacity", and configuration information, which is information different from the hardware resources configuring the virtual machine.

Also, the virtual-machine generating apparatus accepts sets of "virtual-machine name", "the number of CPUs", "memory amount" and "disk capacity" as many as the number of virtual machines to be newly introduced. Subsequently, the virtual-machine generating apparatus determines whether hardware resources identical to the accepted "number of CPUs", "memory amount", and "disk capacity" are stored in the configuration-information storage unit (see (1) of FIG. 1).

Then, when it is determined that such identical hardware resources are stored in the configuration-information storage unit, the virtual-machine generating apparatus generates a new virtual machine, and an OS for the virtual machine having such identical hardware resources is copied, thereby installing the OS for the generated new virtual machine. Here, the virtual-machine generating apparatus performs a process of installing an OS for the new virtual machine by copying the OS of the virtual machine having the identical hardware resources as many times as the number of machines having the identical hardware resources (see (2)-a of FIG. 1).

On the other hand, when it is determined by the virtual-machine generating apparatus that such identical hardware resources are not stored in the configuration-information storage unit, a new virtual machine is generated to install an OS for the virtual machine (see (2)-b of FIG. 1).

As explained above, the virtual-machine generating apparatus can install the OS for the virtual machine newly generated by copying the OS for the virtual machine having the identical hardware resources. As a result, a virtual machine with high reliability can be quickly generated.

Figure 2:
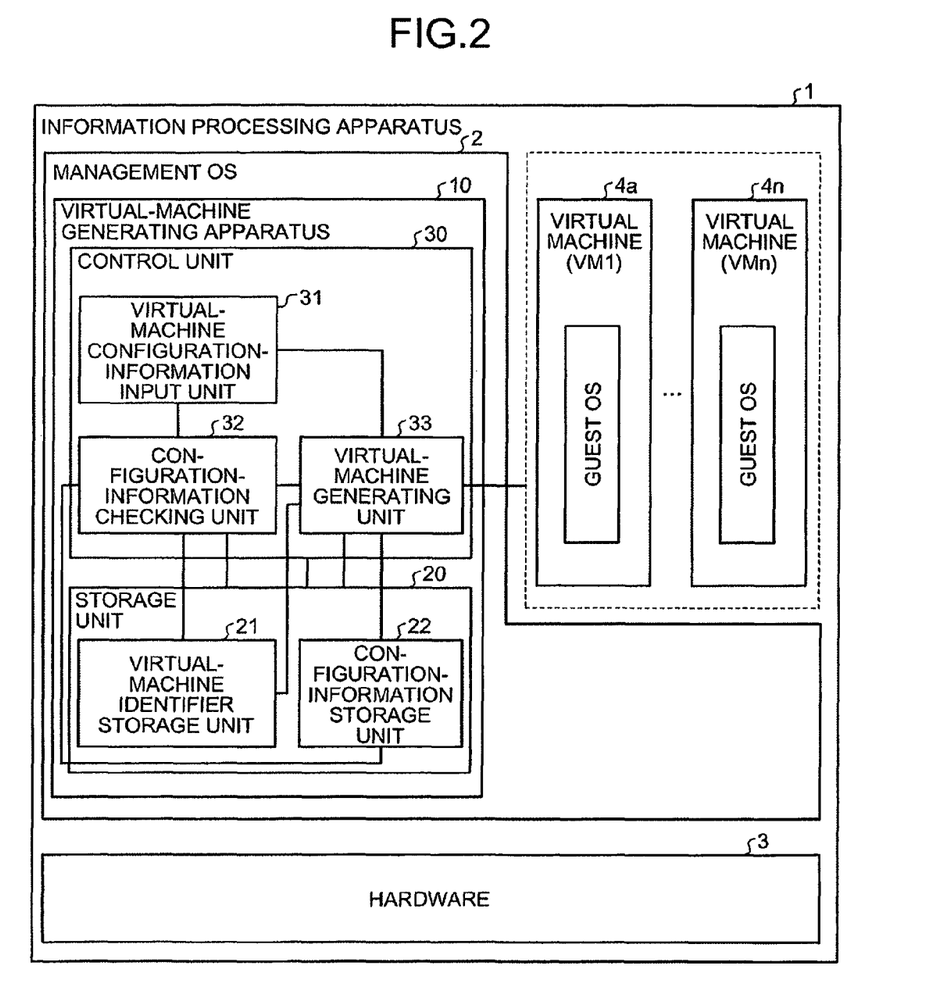
FIG. 2 is a drawing of an example of the configuration of the virtual-machine generating apparatus according to the first embodiment.

Next, the configuration of the virtual-machine generating apparatus according to the first embodiment is explained by using FIG. 2. FIG. 2 is a drawing of an example of the configuration of the virtual-machine generating apparatus according to the first embodiment. As depicted in FIG. 2, a virtual-machine generating apparatus 10 is placed inside of a management OS 2 included in an information processing apparatus 1, has a storage unit 20 and a control unit 30, and newly generates virtual machines VM 4a to 4n. Note that hardware 3 is general hardware set in an information processing apparatus, such as a server apparatus or PC.

The storage unit 20 stores data required for various processes performed by the control unit 30 and various process results obtained from the control unit 30, and particularly includes a virtual-machine identifier storage unit 21 and a configuration-information storage unit 22.

The virtual-machine identifier storage unit 21 stores a plurality of identifiers that each uniquely identify a virtual machine. For example, the virtual-machine identifier storage unit 21 stores a UUID (universally unique ID (identifier)) and a MAC (media access control) address that uniquely identify a virtual machine in association with each other.

Figure 3:
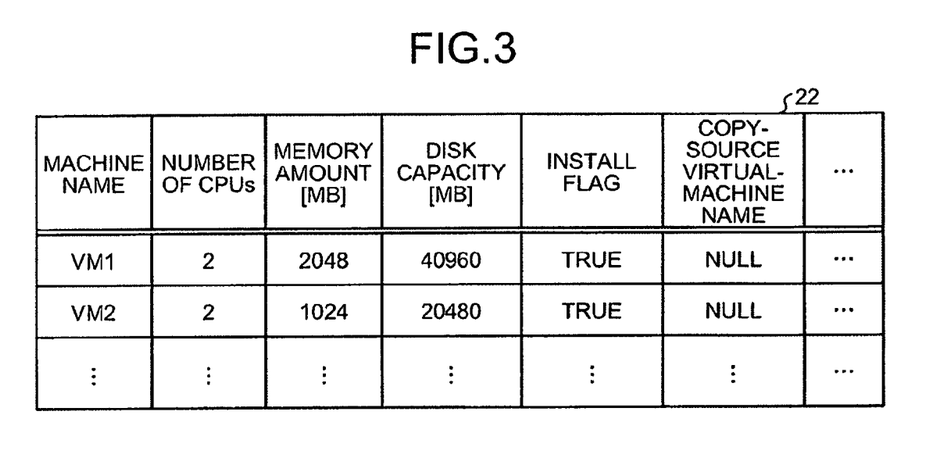
FIG. 3 is a drawing of an example of information stored in a configuration-information storage unit according to the first embodiment.

The configuration-information storage unit 22 stores, in association with unique information of each virtual machine, resources indicative of hardware resource information of the virtual machine and configuration information indicative of information configuring the virtual machine. Specifically, as depicted in FIG. 3, the configuration-information storage unit 22 stores, in association with "machine name", which is unique information of each virtual machine: resources indicative of hardware resource information of the virtual machine, such as "the number of CPUs", "memory amount", and "disk capacity; "install flag" indicating whether it is possible to introduce a virtual machine corresponding to "machine name" through copying; "copy-source virtual-machine name" indicative of unique information of a copy-source virtual machine from which unique information, resources, and configuration information are copied; and configuration information containing various information for operating the OS of the virtual machine.

For example, as depicted in FIG. 3, the configuration-information storage unit 22 stores, in association with a machine name of "VM1": hardware resources including the number of CPUs of "2", a memory amount of "2048", and a disk capacity of "40960"; an install flag of "TRUE (copy disabled)" (or "FALSE (copy enabled)"; a copy-source virtual-machine name of "NULL" (for example, when installation is performed through copying, a machine name of "VM5" is stored, for example); and configuration information. FIG. 3 is a drawing of an example of information stored in the configuration-information storage unit 22 according to the first embodiment.

The control unit 30 includes an internal memory for storing control programs, programs defining various process procedures, and necessary data, and particularly includes a virtual-machine configuration-information input unit 31, a configuration-information checking unit 32, and a virtual-machine generating unit 33. With these components, the control unit 30 performs various processes.

The virtual-machine configuration-information input unit 31 accepts unique information and resources as many as the number of virtual machines to be newly introduced. Specifically, for example, when new virtual machines are generated, the virtual-machine configuration-information input unit 31 accepts inputs of unique information of a virtual machine to be generated of "VM1", the number of CPUs of "2", a memory amount of "2048", and a disk capacity of "40960".

Also, for example, the virtual-machine configuration-information input unit 31 accepts inputs of unique information of a virtual machine to be generated of "VM2", the number of CPUs of "2", a memory amount of "1024", and a disk capacity of "20480". Furthermore, for example, the virtual-machine configuration-information input unit 31 accepts inputs of unique information of a virtual machine to be generated, "VM3", the number of CPUs of "2", a memory amount of "1024", and a disk capacity of "20480". Still further, for example, the virtual-machine configuration-information input unit 31 accepts inputs of unique information of a virtual machine to be generated of "VM4", the number of CPUs of "2", a memory amount of "1024", and a disk capacity of "20480".

The configuration-information checking unit 32 determines whether resources identical to the resources accepted by the virtual-machine configuration-information input unit 31 is stored in the configuration-information storage unit 22. Specifically, in the example explained above, the configuration-information checking unit 32 determines whether hardware resources identical to the number of CPUs "2", the memory amount of "1024", and the disk capacity of "20480" accepted by the virtual-machine configuration-information input unit 31 are stored in the configuration-information storage unit 22.

When it is determined by the configuration-information checking unit 32 that the identical hardware resources are stored in the configuration-information storage unit 22, the virtual-machine generating unit 33 generates a new virtual machine and duplicates basic software of the virtual machine having the identical hardware resources. With this, a basic-software introducing process of introducing basic software of the generated new virtual machine is performed as many times as the number of machines for which it is determined that the identical hardware resources are stored in the configuration-information storage unit 22.

Specifically, as the example explained above, when it is determined by the configuration-information checking unit 32 that identical hardware resources are stored in the configuration-information storage unit 22, the virtual-machine generating unit 33 obtains the machine name of the virtual machine having the identical hardware resources, "VM2", and stores the obtained machine name in the copy-source virtual-machine name of the configuration-information storage unit 22. The virtual-machine generating unit 33 then sets an install flag of "FALSE" for machine names of "VM3" and "VM4" stored in the configuration-information storage unit 22.

Figure 4A:
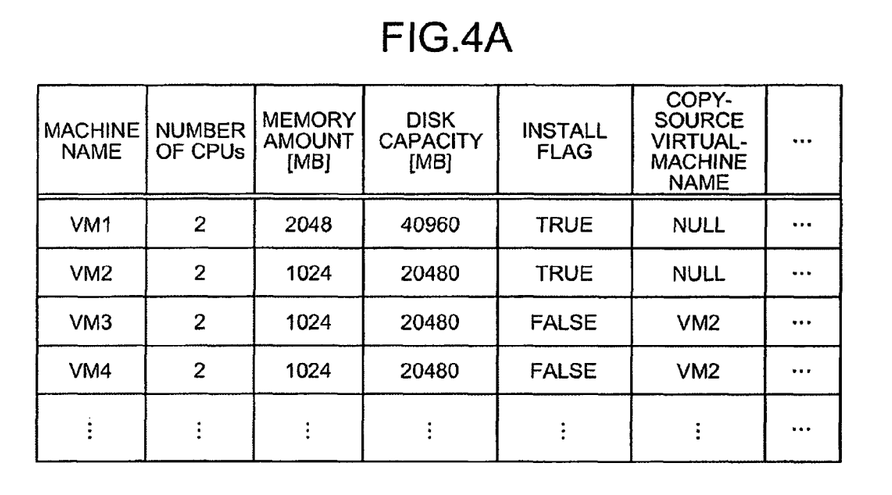
FIG. 4A is a drawing of an example of information stored in the configuration-information storage unit after unique information and resources are input.

When it is determined by the configuration-information checking unit 32 that identical hardware resources are not stored in the configuration-information storage unit 22, the virtual-machine generating unit 33 sets an install flag of "TRUE" for "VM1" and "VM2" stored in the configuration-information storage unit 22 (see FIG. 4A). Furthermore, for "VM1" and "VM2", installation is performed, and then the install flag is updated to "FALSE" after installation. FIG. 4A is a drawing of an example of information stored in the configuration-information storage unit 22 after unique information and resources are input.

Subsequently, based on the stored copy-source virtual-machine name of "VM2", the virtual-machine generating unit 33 copies the unique information of the virtual machine having the identical hardware resources, "VM2", the number of CPUs of "2", the memory amount of "1024", the disk capacity of "20480", and the configuration information. The virtual-machine generating unit 33 then overwrites the information about "VM3" and "VM4" stored in the configuration-information storage unit 22.

The virtual-machine generating unit 33 then generates a new virtual machine and copies the OS of "VM2", thereby installing the OS of the generated new virtual machine. Subsequently, assuming that installation through copying has been completed, the virtual-machine generating unit 33 updates the install flag to "FALSE". Here, the virtual-machine generating unit 33 performs the process explained above for "VM3" and "VM4" having hardware resources identical to those of "VM2". That is, the virtual-machine generating unit 33 performs the above process until the install flag and copy-source virtual-machine name stored in the configuration-information storage unit 22 become "FALSE" and "NULL".

Figure 4B:
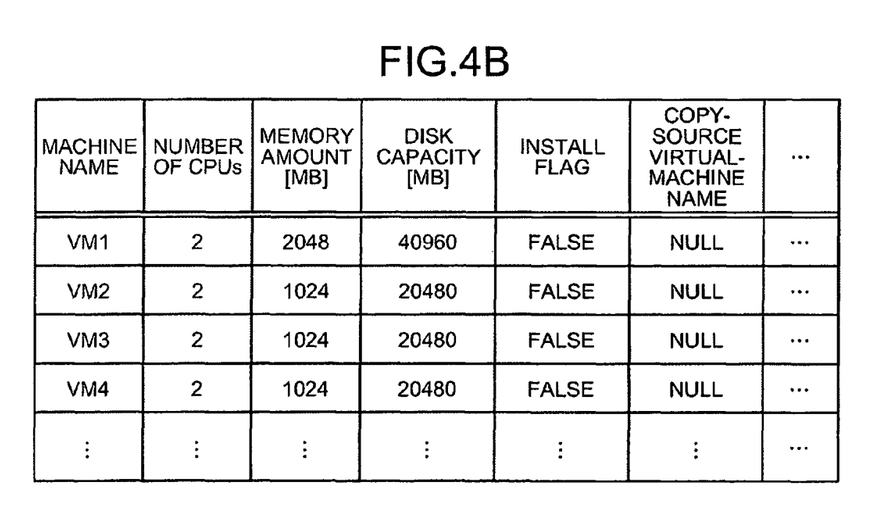
FIG. 4B is a drawing of an example of information stored in the configuration-information storage unit after installation is completed for all virtual machines.

The virtual-machine generating unit 33 then sets the unique information that has become identical because of copying of the unique information, hardware resources, and configuration information so that the unique information does not overlap the unique information of the installed virtual machine. Also, the virtual-machine generating unit 33 sets the UUID and MAC address that uniquely identify the installation-completed virtual machine so that they do not overlap the information stored in the virtual-machine identifier storage unit 21 (see FIG. 4B). FIG. 4B is a drawing of an example of information stored in the configuration-information storage unit 22 after installation is completed for all virtual machines.

Figure 5A:
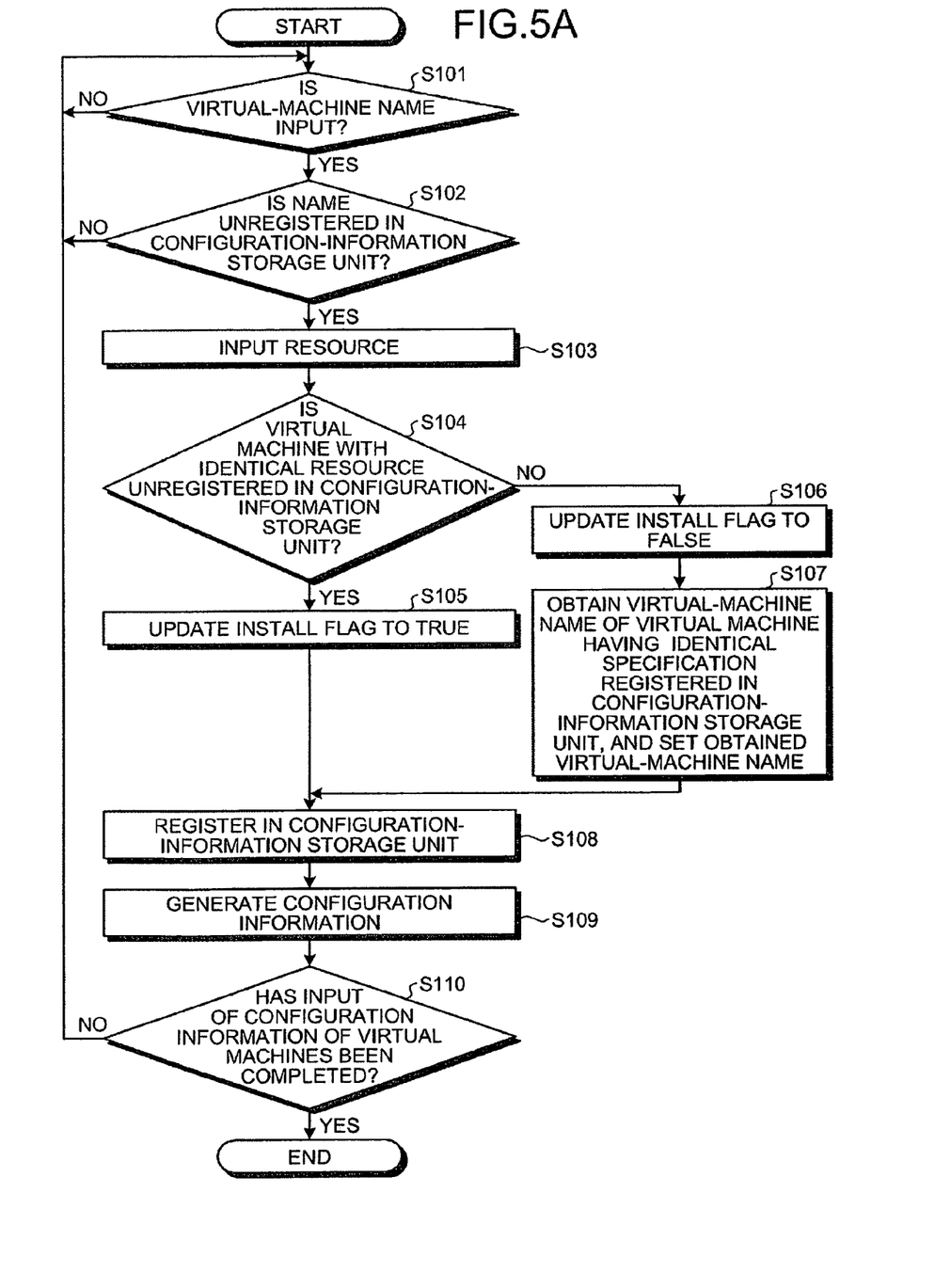
FIG. 5A is a flowchart for explaining a flow of a process by the virtual-machine generating apparatus according to the first embodiment.
Figure 5B:
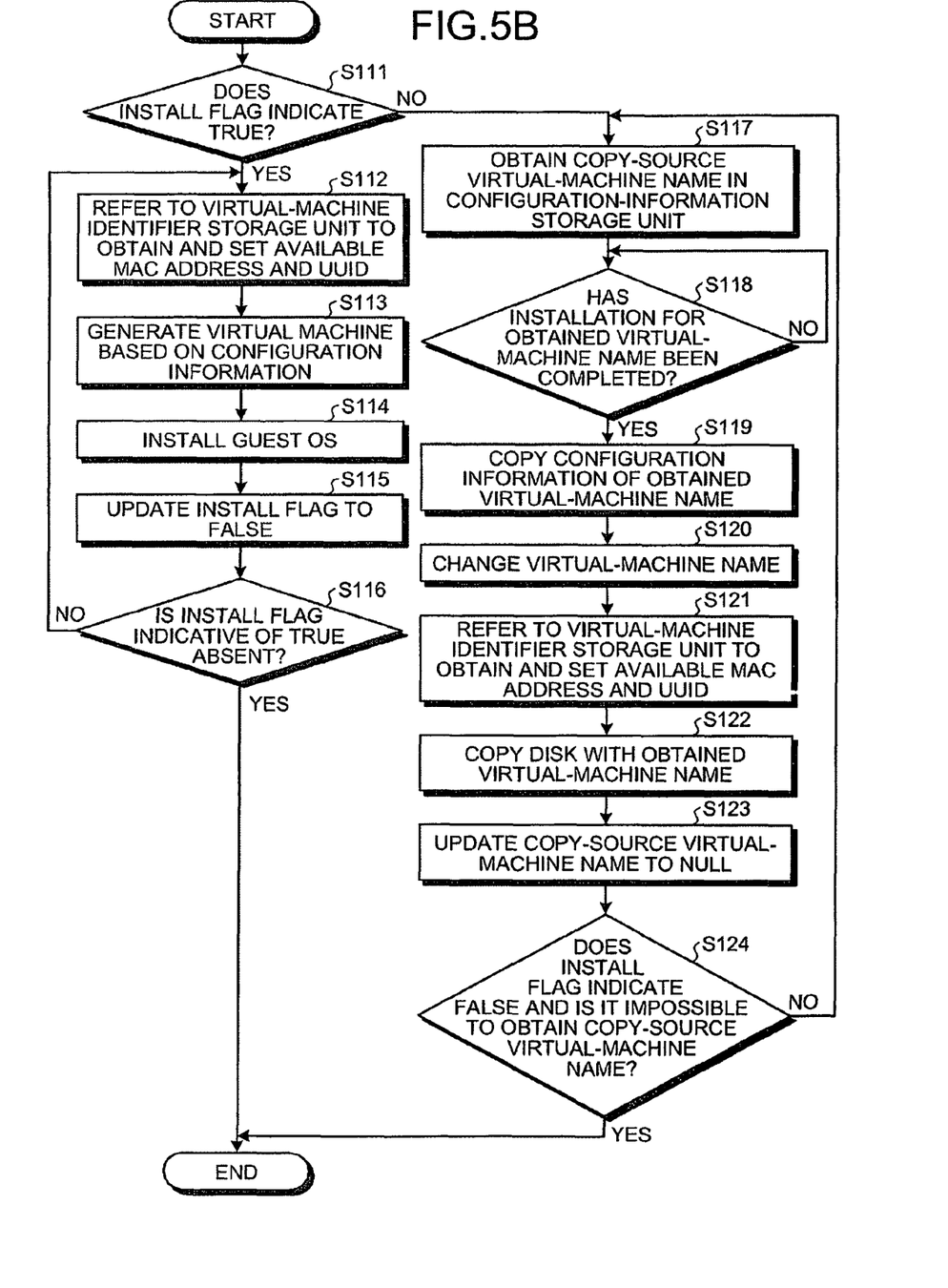
FIG. 5B is a flowchart for explaining the flow of the process by the virtual-machine generating apparatus according to the first embodiment.

Next, a flow of a process by the virtual-machine generating apparatus 10 according to the first embodiment is explained by using FIGS. 5A and 5B. FIGS. 5A and 5B are flowcharts for explaining a flow of a process by the virtual-machine generating apparatus 10 according to the first embodiment.

As depicted in FIG. 5A, when the name of a virtual machine to be newly generated is input (Yes at Step S101), the virtual-machine generating apparatus 10 determines whether the input virtual-machine name is unregistered in the configuration-information storage unit 22 (Step S102).

When the input machine name is unregistered in the configuration-information storage unit 22 (Yes at Step S102), the virtual-machine generating apparatus 10 accepts inputs of hardware resources, that is, the number of CPUs, the memory amount, and the disk capacity (Step S103).

Subsequently, the virtual-machine generating apparatus 10 determines whether a virtual machine having hardware resources identical to the accepted resources is unregistered in the configuration-information storage unit 22 (Step S104). When a virtual machine having hardware resources identical to the accepted resources is unregistered in the configuration-information storage unit 22 (Yes at Step S104), the virtual-machine generating apparatus 10 updates the install flag stored in the configuration-information storage unit 22 to "TRUE" (Step S105).

Also, when a virtual machine having hardware resources identical to the accepted resources is registered in the configuration-information storage unit 22 (No at Step S104), the virtual-machine generating apparatus 10 updates the install flag stored in the configuration-information storage unit 22 to "FALSE" (Step S106). The virtual-machine generating apparatus 10 then obtains the machine name of the virtual machine having hardware resources identical to the resources stored in the configuration-information storage unit 22, and sets the obtained virtual-machine name as "copy-source virtual-machine name" (Step S107).

Subsequently, the virtual-machine generating apparatus 10 stores the input unique information and hardware resources in the configuration-information storage unit 22 (Step S108), and generates configuration information for which no virtual machine having identical hardware resources is unregistered in the configuration-information storage unit 22 (Step S109). The virtual-machine generating apparatus 10 then determines whether configuration information as many as the number of virtual machines to be newly introduced has been input (Step S110).

If configuration information as many as the number of virtual machines to be newly introduced has been input (Yes at Step S110), as depicted in FIG. 5B, the virtual-machine generating apparatus 10 determines whether the install flag stored in the configuration-information storage unit 22 indicates "TRUE" (Step S111).

Subsequently, when the install flag stored in the configuration-information storage unit 22 indicates "TRUE" (Yes at Step S111), the virtual-machine generating apparatus 10 refers to the virtual-machine identifier storage unit 21 to set the MAC address and UUID so that they do not overlap (Step S112).

Then, the virtual machine generating apparatus 10 generating a virtual machine based on the information stored in the configuration-information storage unit 22 (Step S113) and installing a guest OS (Step S114) updates the install flag stored in the configuration-information storage unit 22 to "FALSE" (Step S115). Then, when an install flag indicative of "TRUE" stored in the configuration-information storage unit 22 is absent (Yes at Step S116), the virtual-machine generating apparatus 10 ends the process Also, when the install flag stored in the configuration-information storage unit 22 indicates "FALSE" at Step S111 (No at Step S111), the virtual-machine generating apparatus 10 obtains "copy-source virtual-machine name" stored in the configuration-information storage unit 22 (Step S117).

Then, if the OS of a virtual machine corresponding to the obtained "copy-source virtual-machine name" has been installed (Yes at Step S118), the virtual-machine generating apparatus 10 copies the unique information, hardware resources, and configuration information of the virtual machine whose name has been obtained for overwriting (Step S119).

Subsequently, the virtual-machine generating apparatus 10 sets a machine name so that it does not overlap the "machine name" stored in the configuration-information storage unit 22 (Step S120), and refers to the virtual-machine identifier storage unit 21 and sets a MAC address and UUID so that they do not overlap (Step S121).

Then, the virtual-machine generating apparatus 10 copies the disk of the virtual machine with "copy-source virtual-machine name" stored in the configuration-information storage unit 22 to install the OS (Step S122). The virtual-machine generating apparatus 10 then updates the "copy-source virtual-machine name" corresponding to the virtual machine with the OS installed thereon stored in the configuration-information storage unit 22 to "NULL" (Step S123).

Subsequently, the virtual-machine generating apparatus 10 determines whether the install flag stored in the configuration-information storage unit 22 indicates "FALSE" and it is impossible to obtain a copy-source virtual-machine name (indicating "NULL") (Step S124). When the install flag indicates "FALSE" and the copy-source virtual-machine name indicates "NULL" (Yes at Step S124) for all virtual machines to be introduced, the virtual-machine generating apparatus 10 ends the process.

As explained above, when a virtual machine is newly generated, the virtual-machine generating apparatus 10 accepts inputs of hardware resources and copies the OS of a virtual machine having hardware resources identical to the accepted resources, thereby installing the OS of the virtual machine to be newly generated. Therefore, a virtual machine with high reliability can be quickly generated.

That is, by copying the OS of the virtual machine having the identical hardware resources, the virtual-machine generating apparatus 10 can install the OS of the virtual machine to be newly generated. As a result, compared with the technology requiring a manual operation for installation on a virtual machine to be newly generated, a virtual machine with high reliability can be quickly generated.

For example, the virtual-machine generating apparatus 10 stores in the virtual-machine identifier storage unit 21 a UUID and a MAC address that uniquely identify a virtual machine in association with each other. Also, in association with "machine name", which is unique information of a virtual machine, the virtual-machine generating apparatus 10 stores in the configuration-information storage unit 22 resources indicative of resource information of the virtual machine including "the number of CPUs", "memory amount", and "disk capacity", "install flag" indicative of whether introduction is performed through duplication of a virtual machine corresponding to "machine name", "copy-source virtual-machine name" indicative of unique information of a copy-source virtual machine from which unique information, hardware resources, and configuration information are copied, and configuration information containing various information for operating the OS of the virtual machine. Then, when a new virtual machine is generated, the virtual-machine generating apparatus 10 accepts inputs of unique information of the virtual machine to be generated, "VM3", the number of CPUs of "2", a memory amount of "1024", and a disk capacity of "20480". Subsequently, the virtual-machine generating apparatus 10 determines whether hardware resources identical to the accepted resources are stored in the configuration-information storage unit 22. Then, when it is determined that hardware resources identical to the accepted resources are stored in the configuration-information storage unit 22, the virtual-machine generating apparatus 10 obtains the machine name of a virtual machine having the identical hardware resources, and stores the obtained machine name in the copy-source virtual-machine name of the configuration-information storage unit 22. The virtual-machine generating apparatus 10 then sets the install flag stored in the configuration-information storage unit 22 to "FALSE". Then, based on the stored copy-source virtual-machine name, the virtual-machine generating apparatus 10 copies the unique information, hardware resources, and configuration information of the virtual machine having the identical hardware resources for overwriting. The virtual-machine generating apparatus 10 then generates a new virtual machine and copies the OS of a virtual machine corresponding to the copy-source virtual-machine name to install the OS of the generated new virtual machine. Then, assuming that installation through copying has been completed, the virtual-machine generating apparatus 10 updates the install flag to "FALSE". Subsequently, for the unique information that becomes identical by being copied, the virtual-machine generating apparatus 10 sets unique information of the installed virtual machine so that it does not overlap. The virtual-machine generating apparatus 10 then sets UUID and MAC address that uniquely identify the installation-completed virtual machine so that they do not overlap the information stored in the virtual-machine identifier storage unit 21.

Also, when the OS of a plurality of virtual machines is newly installed, the virtual-machine generating apparatus 10 does not require a manual determination as to whether copying is to be performed or generation from a template is to be manually performed. Therefore, a manual operation can be simplified, and the number of processes can be reduced.

Also, the virtual-machine generating apparatus 10 stores in the configuration-information storage unit 22 various information for all virtual machines to be introduced. Therefore, at the time of operation maintenance in the operation of the OS by each virtual machine, the configuration-information storage unit 22 can be checked to easily make a determination as to which virtual machine is required or not required.

While the first embodiment has been explained, the disclosed virtual-machine generating apparatus, virtual-machine generating method, and virtual-machine generation program can be implemented according to various different embodiments other than the embodiment explained above. Thus, different embodiments are now explained with respect to the information stored in the configuration-information storage unit, the system configuration, and the program.

First, the information stored in the configuration-information storage unit will be explained.

In the first embodiment, the case is explained in which the information about all virtual machines to be introduced is stored in the configuration-information storage unit 22. However, the disclosed virtual-machine generating apparatus, virtual-machine generating method, and virtual-machine generation program are not restricted to this. Alternatively, only the information for installation through copying of the OS may be stored in the configuration-information storage unit 22.

Specifically, when hardware resources identical to the accepted resources are stored in the configuration-information storage unit 22, the virtual-machine generating apparatus 10 copies the OS of a virtual machine having the identical hardware resources for installation without storing the accepted resources in the configuration-information storage unit 22. Also, when hardware resources identical to the accepted resources are not stored in the configuration-information storage unit 22, the virtual-machine generating apparatus 10 stores the accepted resources in the configuration-information storage unit 22, and performs a process similar to that in the first embodiment.

That is, the virtual-machine generating apparatus 10 uses the information stored in the configuration-information storage unit 22 as a storage unit storing only minimum information required for copying the OS of the virtual machine having the identical hardware resources. As a result, the virtual-machine generating apparatus 10 can reduce the amount of data stored in the configuration-information storage unit 22. Also, by cutting back processes, such as copying the configuration information, the process load can be reduced.

With respect to the system configuration, the process procedure, the control procedure, specific names, and information including various data and parameters explained and depicted in the specification and the drawings (for example, the information stored in the configuration-information storage unit 22 depicted in FIG. 2) can be arbitrarily changed unless otherwise specified.

Also, each component depicted is conceptual in function, and is not necessarily physically configured as depicted. That is, the specific patterns of distribution and unification of the components are not meant to be restricted to those depicted in the drawings. For example, the virtual-machine identifier storage unit 21 and the configuration-information storage unit 22 may be unified as a "virtual-machine configuration-information storage unit" that stores unique information, hardware resources, and configuration information in association with the UUID and MAC address. As such, all or part of the components can be functionally or physically distributed or unified in arbitrary units according to various loads and the state of use. Furthermore, all or arbitrary part of the process functions performed in each component can be achieved by a CPU and a program analyzed and executed on that CPU, or can be achieved as hardware with a wired logic.

Figure 6:
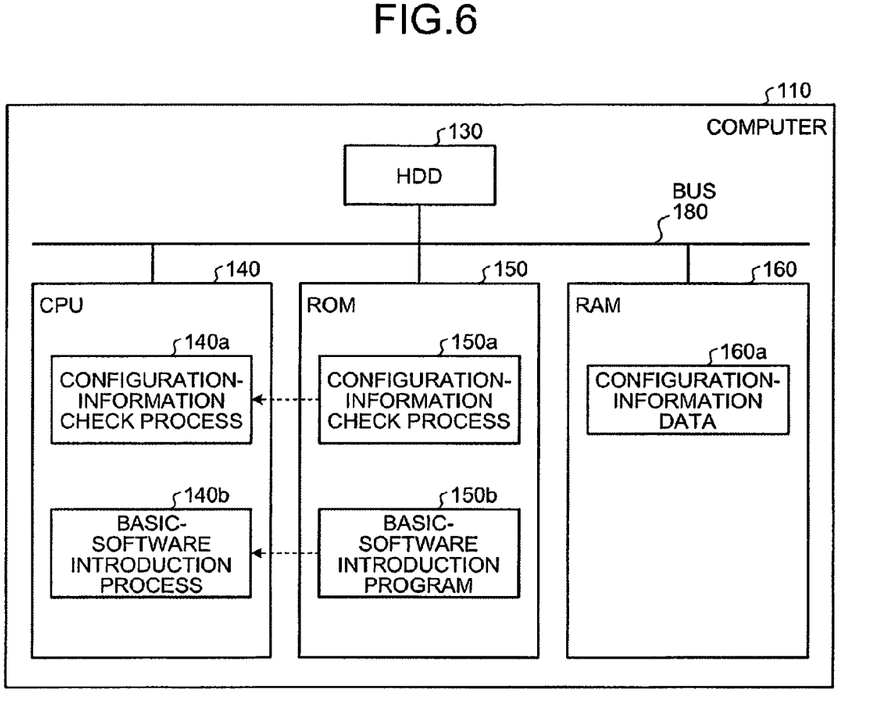
FIG. 6 is a drawing of a computer that executes a virtual-machine generation program.

Meanwhile, in the embodiment, the case is explained in which various processes are achieved with a hardware logic. However, the disclosed virtual-machine generating apparatus, virtual-machine generating method, and virtual-machine generation program are not restricted to this. Alternatively, the processes may be achieved with a program prepared in advance being executed by a computer. In the following, an example of a computer executing a virtual-machine generation program having functions similar to those of the virtual-machine generating apparatus 10 explained in the embodiment is explained. FIG. 6 is a drawing of a computer that executes a virtual-machine generation program.

As depicted in FIG. 6, a computer 110 as a virtual-machine generating apparatus include's a hard disk drive (HDD) 130, a CPU 140, a read-only memory (ROM) 150, and a random access memory (RAM) 160, which are all connected to a bus 180.

The ROM 150 has previously stored therein a virtual-machine generation program achieving function similar to those of the virtual-machine generating apparatus 10 in the first embodiment, that is, as depicted in FIG. 6, a configuration-information check program 150a and a basic-software introduction program 150b. Here, as with the components of the virtual-machine generating apparatus 10 depicted in FIG. 2, these programs 150a and 150b may be unified or distributed as appropriate.

With the CPU 140 reading these programs 150a and 150b from the ROM 150 for execution, as depicted in FIG. 6, the programs 150a and 150b function as a configuration-information check process 140a and a basic-software introduction process 140b. Here, the processes 140a and 140b correspond to the configuration-information checking unit 32 and the virtual-machine generating unit 33 depicted in FIG. 2.

Based on configuration-information data 160a recorded in the RAM 160, the CPU 140 executes the virtual-machine generation program.

Here, the programs 150a and 150b are not necessarily stored in the ROM 150 from the start. For example, each of these programs may be stored in a "portable physical medium" inserted in the computer 110, such as a flexible disk (FD), CD-ROM (compact-disk read only memory), DVD (digital versatile disc), magneto-optical disk (MO), or IC (integrated circuit) card; a "fixed physical medium" inside or outside of the computer 110, such as an HDD; or further "another computer (or server)" connected to the computer 110 via a public line, the Internet, a LAN (local area network), or a WAN (wide area network), and be read by the computer 110 therefrom for execution.

According to the virtual-machine generating apparatus, virtual-machine generating method, and virtual-machine generation program disclosed in the present application, an effect of quickly generating a virtual machine with high reliability can be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A virtual-machine generating apparatus comprising:
a processor;
a configuration-information storage unit that stores, for each of a plurality of virtual machines, resource information indicative of hardware resources of each virtual machine, including a number of CPUs, a memory amount and a disk capacity in association with a unique information of each virtual machine, the configuration-information storage unit further stores information including an install flag and a name of a copy-source machine in association with the unique information of each virtual machine;
a configuration-information checking unit executing on the processor that, when generating a first virtual machine in the plurality of virtual machines, accepts unique information and resource information of the first virtual machine, and determines whether a resource information identical to the resource information of the first virtual machine is stored in the configuration-information storage unit; and
a virtual machine generating unit executing on the processor that, when it is determined that the resource information identical to the resource information of the first virtual machine is stored in the configuration-information storage unit,
(i) sets the install flag corresponding to the first virtual machine to a first value,
(ii) acquires and temporarily stores, as the name of the copy-source virtual machine corresponding to the first virtual machine, the unique information of a second virtual machine whose resource information is determined to be identical to the resource information of the first virtual machine,
(iii) installs an operating system of the first virtual machine by copying an operating system from a disk of the second virtual machine, and
(iv) after installing the operating system of the first virtual machine, deletes the name of the copy-source virtual machine associated with the first virtual machine from the configuration-information storage unit.

2. The virtual-machine generating apparatus according to claim 1, wherein
the unique information and the resource information of the first virtual machine are stored in the configuration-information storage unit,
the virtual machine generating unit copies the unique information and the resource information of the second virtual machine that are stored in the configuration-information storage unit, and overwrites the unique information and resource information of the first virtual machine with the copied unique information and the resource information of the second virtual machine, and wherein
the virtual-machine generating apparatus further comprises a unique-information setting unit that sets the unique information of each virtual machine in the plurality of virtual machines so that the unique information of the plurality of virtual machines does not overlap.

3. The virtual-machine generating apparatus according to claim 1, further comprising:
a virtual-machine identifier storage unit that stores a plurality of identifiers in the virtual-machine identifier storage unit that is used to uniquely identify any one virtual machine in the plurality virtual machines; and
a virtual-machine identifier setting unit that sets each of the plurality of identifiers by assigning a different identifier from any other identifiers stored in the virtual-machine identifier storage unit.

4. The virtual-machine generating apparatus according to claim 3, wherein
the plurality of identifiers include a UUID (universally unique identifier) and an MAC (Media Address Control) address, and
the virtual-machine identifier setting unit sets the UUID and the MAC address of the first virtual machine so that the assigned UUID and the MAC address of the first virtual machine are different from any other UUIDs and the MAC addresses stored in the virtual-machine identifier storage unit.

5. The virtual-machine generating apparatus according to claim 1, wherein
the virtual machine generating unit, when it is determined that the resource information identical to the resource information of the first virtual machine is not stored in the configuration-information storage unit,
(v) sets the install flag corresponding to the first virtual machine to a second value,
(vi) generates the first virtual machine based on the resource information by installing an operating system of the first virtual machine,
(vii) after generating the first virtual machine, sets the install flag corresponding to the first virtual machine to the first value, and
the virtual machine generating unit performs steps (i) to (vii) until there is no virtual machine remains in the configuration-information storage unit for which the install flag is set to the first value and for which the name of the copy-source virtual machine is stored.

6. A virtual-machine generating method comprising:
storing in a configuration-information storage unit resource information indicative of hardware resources of each of a plurality of virtual machines, including a number of CPUs, a memory amount and a disk capacity in association with a unique information of each virtual machine, and further storing in the configuration-information storage unit information including an install flag and a name of a copy-source machine in association with the unique information of each virtual machine;
accepting, when generating a first virtual machine in the plurality of virtual machines, unique information and resource information of the first virtual machine and determining whether a resource information identical to the resource information of the first virtual machine is stored in the configuration-information storage unit; and
when it is determined that the resource information identical to the resource information of the first virtual machine is stored in the configuration-information storage unit,
(i) setting the install flag corresponding to the first virtual machine to a first value,
(ii) acquiring and temporarily storing, as the name of the copy-source virtual machine corresponding to the first virtual machine, the unique information of a second virtual machine whose resource information is determined to be identical to the resource information of the first virtual machine,
(iii) installing an operating system of the first virtual machine by copying an operating system from a disk of the second virtual machine, and (iv) after installing the operating system of the first virtual machine, deleting the name of the copy-source virtual machine associated with the first virtual machine from the configuration-information storage unit.

7. A non-transitory computer readable storage medium containing instructions that, when executed by a computer, causes the computer to perform:

storing in a configuration-information storage unit resource information indicative of hardware resources of each of a plurality of virtual machines, including a number of CPUs, a memory amount and a disk capacity in association with a unique information of each virtual machine, and further storing in the configuration-information storage unit information including an install flag and a name of a copy-source machine in association with the unique information of each virtual machine;

accepting, when generating a first virtual machine in the plurality of virtual machines, the unique information and the resource information of the first virtual machine and determining whether a resource information identical to the resource information of the first virtual machine is stored in the configuration-information storage unit; and when it is determined that the resource information identical to the resource information of the first virtual machine is stored in the configuration-information storage unit, (i) setting the install flag corresponding to the first virtual machine to a first value, (ii) acquiring and temporarily storing, as the name of the copy-source virtual machine corresponding to the first virtual machine, the unique information of a second virtual machine whose resource information is determined to be identical to the resource information of the first virtual machine, (iii) installing an operating system of the first virtual machine by copying an operating system from a disk of the second virtual machine, and (iv) after installing the operating system of the first virtual machine, deleting the name of the copy-source virtual machine associated with the first virtual machine from the configuration-information storage unit.

* * * * *